(12) United States Patent
Tanigawa et al.

(10) Patent No.: US 8,750,663 B2
(45) Date of Patent: Jun. 10, 2014

(54) COUPLED MULTICORE FIBER

(75) Inventors: Shoji Tanigawa, Sakura (JP); Katsuhiro Takenaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 90 days.

(21) Appl. No.: 13/587,173

(22) Filed: Aug. 16, 2012

(65) Prior Publication Data

US 2013/0044988 A1    Feb. 21, 2013

(30) Foreign Application Priority Data

Aug. 17, 2011    (JP) .................................. 2011-178402

(51) Int. Cl.
| | |
|---|---|
| *G02B 6/36* | (2006.01) |
| *G02B 6/02* | (2006.01) |
| *C03B 37/012* | (2006.01) |
| *G02B 6/14* | (2006.01) |
| *G02B 6/28* | (2006.01) |
| *G02B 6/036* | (2006.01) |
| *G02B 6/028* | (2006.01) |

(52) U.S. Cl.
CPC ......... *G02B 6/02042* (2013.01); *C03B 2203/26* (2013.01); *C03B 2201/86* (2013.01); *C03B 2203/34* (2013.01); *G02B 6/14* (2013.01); *C03B 37/01222* (2013.01); *G02B 6/2804* (2013.01); *C03B 2203/22* (2013.01); *G02B 6/03633* (2013.01); *G02B 6/0288* (2013.01)
USPC ........................................................ 385/126

(58) Field of Classification Search
USPC ......................................................... 385/126
See application file for complete search history.

(56) References Cited

U.S. PATENT DOCUMENTS 6,229,944 B1 *    5/2001    Yokokawa et al. ........... 385/114

OTHER PUBLICATIONS

Kokubun, Yasuo et al., "Novel multi-core fibers for mode division multiplexing: proposal and design principle", IEICE Electronics Express, vol. 6, No. 8, pp. 522-528, cited in specification.

* cited by examiner

*Primary Examiner* — Uyen Chau N Le
*Assistant Examiner* — Hoang Tran
(74) *Attorney, Agent, or Firm* — Westerman, Hattori, Daniels & Adrian, LLP

(57) ABSTRACT

A coupled multi-core fiber 10 includes a plurality of cores 11 and a clad 12 surrounding the plurality of cores 11, wherein the plurality of cores 11 are arranged in such a way that periphery surfaces of the adjacent cores 11 contact with each other, each of the cores 11 is made to have a refractive index higher than the clad 12 and includes: an outer region 16 having a predetermined thickness from the periphery surface; and an inner region 15 made to have a higher refractive index than the outer region 16 and surrounded by the outer region 16.

4 Claims, 4 Drawing Sheets

COUPLED MULTICORE FIBER

TECHNICAL FIELD

The invention relates to a coupled multicore fiber capable of easily extracting lights propagating through respective cores while the adjacent cores are coupled strongly.

BACKGROUND ART

An optical fiber used in an optical fiber communication system that is currently popular has a structure in which the periphery of one core is coated by a clad to allow optical signals to propagate through the core so as to transmit information. In recent years, an amount of information significantly increases along with popularization of optical fiber communication systems. To handle such an increase of the amount of information to be transmitted, a large number of, that is, tens to hundreds of optical fibers are used in an optical fiber communication system so as to perform large amount and long distance optical communications.

To decrease the number of optical fibers in such optical fiber communication system, it is known to use a multi-core fiber in which the peripheries of a plurality of cores are coated by one clad to allow signals to propagate through the respective cores so as to transmit a plurality of signals.

As such multi-core fibers, a non-coupled multi-core fiber and a coupled multi-core fiber are known. In a non-coupled multi-core fiber, respective cores work as transmission passes independent of each other and the cores are coupled as weakly as possible. In a coupled multi-core fiber, respective cores are coupled to each other so that the plurality of cores can be substantially regarded as one multimode transmission path. This coupled multi-core fiber enables mode multiplexing transmission which transmits different signals for respective modes of lights propagating through the cores.

Non Patent Document 1 listed below discloses an example of such a coupled multi-core fiber. According to Non Patent Document 1, the closer the respective cores of a coupled multi-core fiber are arranged, the stronger the cores are coupled. Therefore, it can be thought that the cores are coupled most strongly when the cores contact with each other.

[Non Patent Document 1] Yasuo Kokubun "Novel multi-core fibers for mode division multiplexing: proposal and design principle" IEICE Electronics Express, Vol. 6, No. 8

SUMMARY OF INVENTION

According to the content disclosed in Non Patent Document 1, a state where the cores contact with each other is preferable because a difference of the propagation constants between modes, which can propagate, can be large and thus the adjacent cores can be coupled to each other most strongly. However, when mode multiplexing transmission is performed by using a coupled multicore fiber in which respective cores merely contact with each other, distances between the cores adjacent to each other are too small, and thus it is difficult to extract individual lights propagating through the respective cores. Therefore, it becomes difficult to design an input/output device for a multicore fiber.

On the other hand, when the distances between the respective cores are set large in order to easily extract individual lights propagating through the respective cores, the respective cores are usually coupled weakly.

Therefore, an object of the invention is to provide a coupled multicore fiber capable of easily extracting lights propagating through the respective cores while the adjacent cores are coupled strongly.

In order to achieve the objects, a coupled multi-core fiber of the present invention includes a plurality of cores and a clad surrounding the plurality of cores, wherein the plurality of cores are arranged in such a way that periphery surfaces of adjacent cores among the cores contact with each other, each of the cores is made to have a refractive index higher than the clad and includes: an outer region having a predetermined thickness from a corresponding one of the periphery surfaces; and an inner region made to have a higher refractive index than the outer region and surrounded by the outer region.

In the coupled multicore fiber described above, the outer region of each of the cores has the refractive index between the refractive index of the inner region and the refractive index of the clad, and thus a low-intensity light can spread farther from the center of the core comparing to a case where a core does not have such an outer region. In other word, the intensity distribution of a light in the core along a diameter direction has a wider base. Therefore, even when the center-to-center distances between the cores are large, electromagnetical field distributions of lights propagating through the respective cores adjacent to each other can have more overlapping parts, and thus the adjacent cores can be strongly coupled. Therefore, comparing to a plurality of cores having no outer regions and arranged separately from each other, the adjacent cores can be coupled more strongly to each other, and thus a difference of the propagation constants between modes can be larger. Consequently, a more preferable transmission path for mode multiplexing transmission can be realized. In addition, since each of the cores includes an outer region, the center-to-center distances of the cores adjacent to each other can be larger comparing to a case where periphery surfaces of cores having no outer regions contact with each other if a difference of propagation constants are the same in the both cases. Further, since the cores include the inner regions, the electromagnetical field distributions tend to concentrate on the inner regions of the respective cores. Therefore, individual lights propagating through the respective cores adjacent to each other can be extracted more easily comparing to the case where periphery surfaces of cores having no outer regions contact with each other. As described above, with the coupled multicore fiber of the present invention, mode multiplexing transmission can be appropriately performed, and it is easy to extract individual lights propagating through the respective cores and is easy to perform mode separation utilizing light interference in an input/output device.

A refractive index distribution of the inner region is preferably α power distribution. With such a refractive index distribution, an intensity of a light at the center of the core can be higher.

When the inner region is made to have the refractive index distribution of α power distribution, the α power distribution may be expressed by an equation $n(r)=n_1[1-2\Delta(r/a)^\alpha]^{1/2}$, where "r" represents a distance from the center of the inner region, "$n_1$" represents the refractive index of the inner region at the center thereof, "Δ" represents a relative refractive index difference of the inner region from the outer region, and "a" is a diameter of the inner region, and "α" may be set to 1.5 to 5.

In addition, a relative refractive index difference of the inner region from the clad at a position where the refractive index is the highest in the inner region may be set to 0.85% to 3.5%, and a relative refractive index difference of the outer region from the clad may be set to 0.3% to 0.8%.

Further, a ratio of a diameter of the inner region and a diameter of each of the cores may be set to 0.5 to 0.9.

As described above, a coupled multicore fiber capable of easily extracting lights propagating through respective cores while the adjacent cores are coupled strongly can be provided according to the present invention.

EMBODIMENT OF THE INVENTION

Figure 1A:
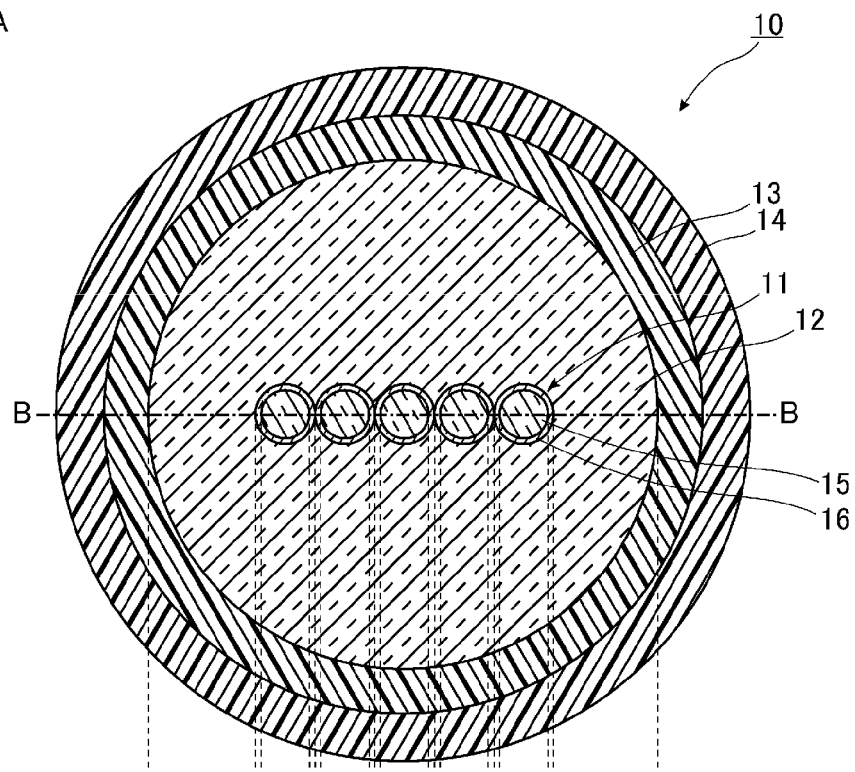
FIGS. 1A and 1B are views showing an aspect of a coupled multi-core fiber according to a first embodiment of the invention.

Suitable embodiments of a coupled multicore fiber according to the invention will be described hereinafter referring to the drawings. For convenience of understanding, scales of the respective drawings and scales in the following description may differ from each other.
(First Embodiment)

Figure 1B:
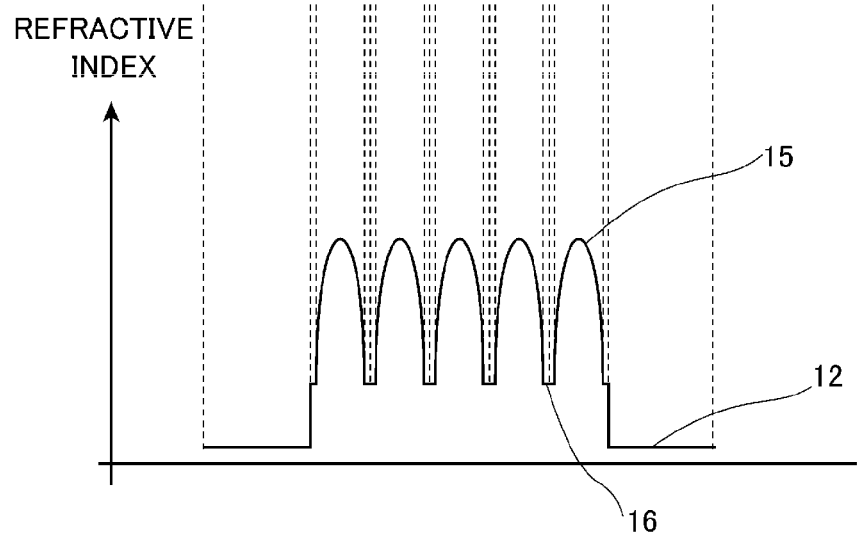

FIGS. 1A and 1B are views showing an aspect of a coupled multi-core fiber (referred to as a multi-core fiber, hereinafter) according to a first embodiment of the invention. Specifically, FIG. 1A is a sectional view perpendicular to the longitudinal direction of the coupled multi-core fiber according to the first embodiment, and FIG. 1B is a view showing the refractive index distribution along the line B-B of FIG. 1A.

As shown in FIG. 1A, the multi-core fiber 10 of this embodiment includes: a plurality of cores 11; a clad 12 surrounding the periphery surfaces of the plurality of cores 11 without gaps therebetween; an inner protective layer 13 coating the periphery surface of the clad 12; and an outer protective layer 14 coating the periphery surface of the inner protective layer 13.

In this embodiment, the plurality of cores 11 having the same diameter are arranged linearly along a radial direction of the clad 12 while the periphery surfaces of adjacent cores 11 contact with each other.

As shown in FIG. 1A, in the multi-core fiber 10, each of the cores 11 has a two-layered structure and each of the cores 11 has an outer region 16 having a predetermined thickness from the periphery surface of the core 11 and an inner region 15 surrounded by the outer region 16. As shown in FIG. 1B, the respective cores 11 have similar refractive index distributions to each other. The refractive indexes of the respective outer regions 16 are set to be constant and higher than the refractive index of the clad 12. The refractive index of each of the inner regions 15 is set to be higher than the refractive index of each of the outer regions 16, and the inner region 15 is made to have the highest refractive index at the center side and to have substantially the same refractive index as the outer region 16 at the periphery side of the inner region 15. With such configuration, the respective cores 11 in whole are made to have higher refractive indexes than the clad 12.

In this embodiment, the profile of the refractive index distribution of the inner region 15 is $\alpha$ power distribution. The $\alpha$ power distribution referred herein is a distribution having a refractive index n(r) expressed by Equation (1) below.

$$n(r)=n_1[1-2\Delta(r/a)^{\alpha}]^{1/2} \tag{1}$$

In the equation, "r" represents a distance from the center of the inner region 15, "$n_1$" represents a refractive index of the inner region 15 at the center thereof, "$\Delta$" represents a relative refractive index difference from the outer region 16 and "a" represents an outermost diameter of the $\alpha$ power distribution. When the refractive index distribution of the inner region 15 is set to be the $\alpha$ power distribution in whole as set in this embodiment, "a" is the same as the diameter of the inner region 15. The value of $\alpha$ can be set to about 1.2 to 10, for example, but is not particularly limited thereto and preferably set to 1.5 to 5 from the viewpoint of preventing breakage of glass during production. Incidentally, when the inner region 15 is made to have the $\alpha$ power distribution, the $\alpha$ power distribution may deviate from an ideal $\alpha$ power distribution due to unevenly distributed dopants or the like, however an effective $\alpha$ power distribution as a whole is acceptable.

In an area where the relative refractive index is the highest in the inner region 15 that is the center thereof, the relative refractive index difference from the clad 12 is preferably set to 0.85% to 3.5% and more preferably set to 1.0% to 1.9% for a core having the refractive index distribution of the $\alpha$ power distribution because such a multi-core fiber is more suitable for practical use from the viewpoint of connection characteristics and mode propagation characteristics. In addition, the relative refractive index difference of the outer region 16 from the clad 12 is preferably set to 0.3% to 0.8%.

The inner region 15 having such a refractive index distribution may be made of germanium-doped silica glass, for example, and the concentration of germanium is distributed in such a manner that the refractive index distribution shown in FIG. 1B is provided. The outer region 16 is made of silica glass undoped with germanium. Such a silica glass undoped with germanium may be pure silica glass without any dopant, or silica glass slightly doped with chlorine in order to eliminate OH group from silica at the step of producing the core 11, for example. Such slightly doped chlorine varies the refractive index of silica glass little. When the outer region 16 is made of pure silica glass or silica glass slightly doped with chlorine, the clad 12 is made of silica glass doped with a dopant that decreases the refractive index. Such a dopant that decreases refractive index may be fluorine, for example.

In addition, the diameter of each of the cores 11 of the multi-core fiber 10 can be 4 to 10 μm, for example, but is not particularly limited thereto. The thickness of the outer region 16 may be set to 0.1 μm or more and more preferably set to 0.2 μm or more. Further, the ratio of the diameter of the inner region 15 to the diameter of the core 11 (the outer diameter of the outer region 16) is preferably set to 0.5 to 0.9 and more preferably set to 0.8 to 0.9 because such a value is practical but not particularly limited thereto. Therefore, when the diameter of the core 11 is set to 5 μm, for example, the diameter of the inner region 15 can be set to 4 μm to 4.5 μm, for example, but is not particularly limited thereto. Thus, the upper limit of the thickness of the outer region 16 should be the thickness ensuring the inner region as described above. Also, the diameter of the clad 12 can be 125 μm, for example, but is not limited thereto.

In addition, the materials of the inner protective layer 13 and the outer protective layer 14 may be ultraviolet curable resin of different types, for example.

As described above, in the multi-core fiber 10 according to the embodiment, the outer region 16 of each of the cores 11 has a refractive index between the refractive index of the inner region 15 and the refractive index of the clad 12. Therefore, when a light propagates through the core, a light of intensity lower than a light at the center of the core can spread farther from the center of the core comparing to a core without the outer region 16. In other word, the profile of the intensity distribution of a light in the core 11 along a diameter direction has a wider base. Therefore, the electromagnetical field distributions of lights propagating through the respective cores 11 adjacent to each other can have more overlapping parts, and thus the adjacent cores 11 can be strongly coupled. Thus, even when the center-to-center distances between the cores 11 are large similarly to a plurality of cores arranged separately from each other to have the same center-to-center distances as the respective cores 11 of the multi-core fiber 10 but having no outer regions, a difference of the propagation constants between modes can be larger. Consequently, the adjacent cores 11 can be strongly coupled to each other. Since the cores 11 are coupled to each other as described above, the respective cores correlate to each other so that the cores can be regarded as a multimode transmission path as a whole. Therefore, the multi-core fiber 10 described above is capable of mode multiplexing transmission, in which signals are superimposed to respective modes of lights propagating through the cores 11. Communications using such mode multiplexing transmission can be Multi-Input Multi-Output (MIMO) communications, for example. Here, since the multi-core fiber 10 described above has a big propagation constant difference between respective modes as described above, the multi-core fiber 10 is capable of mode multiplexing/demultiplexing at input/output sections of the respective modes more easily comparing to a Graded-Index (GI) multimode fiber and a Step-Index (SI) multimode fiber which are common, and thus is more suitable for mode multiplexing transmission. In addition, since the respective cores 11 have the outer regions 16, the center-to-center distances between the cores adjacent to each other can be larger comparing to the case where the periphery surfaces of the cores without the outer regions 16 contact with each other. Therefore, individual lights propagating through the respective cores adjacent to each other can be extracted more easily comparing to the case where the periphery surfaces of the cores without outer regions contact with each other. When mode multiplexing transmission is performed as described above, it is easier to extract individual lights propagating through the respective cores and thus easier to perform mode separation utilizing light interference in an input/output device comparing to the case where the periphery surfaces of the cores without the outer regions 16 contact with each other.

Next, a method of producing the multi-core fiber 10 will be described.

(First Producing Method)

A first method of producing the multi-core fiber 10 will be described first. In the first producing method, a preform for a coupled multi-core fiber (referred to as a preform hereinafter) is produced, and then the produced preform is drawn to produce a multi-core fiber.

Figure 2:
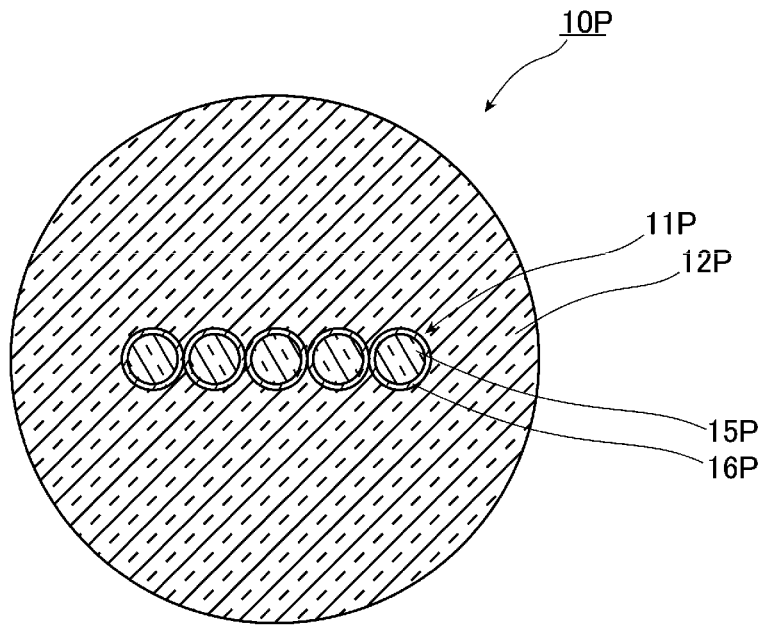
FIG. 2 is a sectional view perpendicular to the longitudinal direction of a preform for a coupled multicore fiber to produce the multi-core fiber shown in FIGS. 1A and 1B.

FIG. 2 is a view showing an aspect of a cross-section perpendicular to the longitudinal direction of a preform to produce the multi-core fiber shown in FIGS. 1A and 1B. As shown in FIG. 2, a preform 10P has a substantially cylindrical shape and includes: a plurality of rod-shaped core glass bodies 11P to be the respective cores 11; and a clad glass body 12P that is to be the clad 12 and surrounds the core glass bodies 11P. Each of the core glass bodies 11P includes an inner region 15P and an outer region 16P surrounding the inner region 15P. The cross-section structure of this preform 10P is made to be substantially homologous with the cross-section structure of the multi-core fiber 10 excepting for the inner protective layer 13 and the outer protective layer 14. The preform 10P described above is drawn and coated as described later to be the multi-core fiber 10 shown in FIGS. 1A and 1B.

Figure 3:
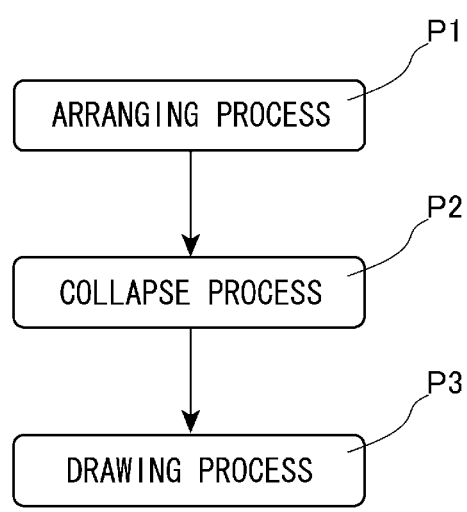
FIG. 3 is a flowchart showing processes of a first method of producing the multi-core fiber shown in FIGS. 1A and 1B.

FIG. 3 is a flowchart showing processes for producing the preform 10P shown in FIG. 2 and the first producing method of producing the multi-core fiber shown in FIGS. 1A and 1B. As shown in FIG. 3, the processes in the method of producing the preform 10P include: an arranging process P1 for arranging core glass bodies and a clad glass body; and a collapse process P2 for collapsing gaps between the core glass bodies and the clad glass body. And the method of producing the multi-core fiber 10 further includes a drawing process P3 for drawing the preform 10P produced as described above.

<Arranging Process P1>

Figure 4:
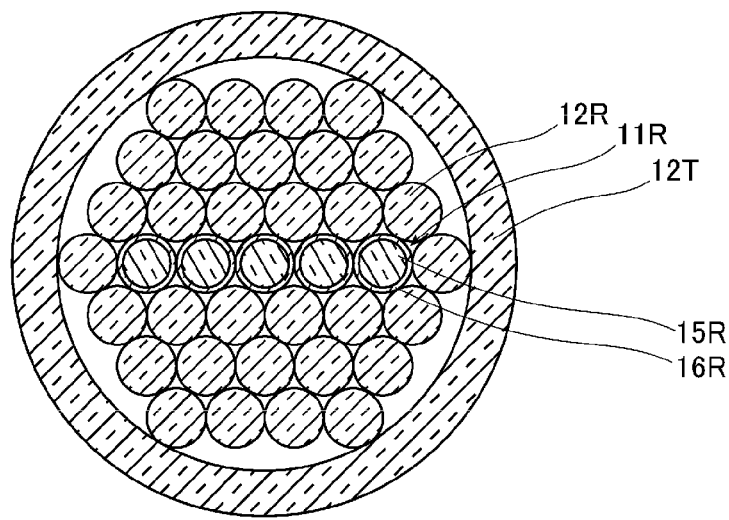
FIG. 4 is a view showing a state where core glass bodies and a clad glass body are arranged.

FIG. 4 is a view showing a state where core glass bodies and clad glass bodies are arranged. In the arranging process P1, firstly, a plurality of core glass bodies 11R shown in FIG. 4 are prepared. The core glass bodies 11R are glass bodies to be the core glass bodies 11P shown in FIG. 2, and glass bodies finally to be the respective cores 11 of the multi-core fiber 10 shown in FIGS. 1A and 1B. Therefore, the number of core glass bodies 11R to be prepared is the same as the number of cores 11. In addition, each of the core glass bodies 11R is rod-shaped having substantially the same shape and size as each of the core glass bodies 11P shown in FIG. 2. Further, each of the core glass bodies 11R includes: an inner region 15R made of a material similar to the material of the inner region 15 of each of the cores 11; and an outer region 16R that surrounds the inner region 15R, is made of a material similar to the material of the outer region 16 of the core 11, and has a predetermined thickness. Therefore, in this embodiment, the inner region 15R is doped with germanium in such a way that the refractive index thereof is α power distribution. The predetermined thickness of this outer region 16R is preferably set to 0.1 mm or more and more preferably set to 0.2 mm or more, but is not particularly limited thereto as long as the inner region 15R can be ensured and germanium doped into the inner region 15R is prevented from volatilizing while heated as described later.

In addition to the preparation of the core glass bodies 11R, clad glass bodies are prepared. Clad glass bodies to be prepared include a plurality of rod-shaped clad glass bodies 12R and one tubular clad glass body 12T. These clad glass bodies 12R and 12T are glass bodies to be the clad glass body 12P shown in FIG. 2, and glass bodies finally to be the clad 12 of the multi-core fiber 10 shown in FIGS. 1A and 1B. Therefore, the material for the clad glass bodies 12R and 12T is chosen to be similar to the material for the clad 12 described above.

Next, the plurality of core glass bodies 11R and the plurality of clad glass bodies 12R are arranged inside the through hole of the tubular clad glass body 12T. Specifically, the respective core glass bodies 11R are arranged in such a way that the plurality of core glass bodies 11R are in one horizontal line while the periphery surfaces of adjacent core glass bodies 11R contact with each other, and the respective clad glass bodies 12R are arranged in such a way that the core glass bodies 11R in the horizontal line are surrounded by the plurality of clad glass bodies 12R. Here, it is preferable that the clad glass bodies 12R having different diameters be prepared and arranged from the viewpoint of decreasing gaps inside the through hole of the clad glass body 12T although this is not particularly shown.

Thus, a state where the core glass bodies 11R and the clad glass bodies 12R and 12T are arranged as shown in FIG. 4 is provided.

<Collapse Process P2>

Next, the arranged core glass bodies 11R and the clad glass bodies 12R and 12T are heated for collapse. In other word, spaces in the through hole of the clad glass body 12T such as spaces between the core glass bodies 11R and the clad glass bodies 12R are collapsed so that the core glass bodies 11R and the clad glass bodies 12R and 12T are integrated. Thus, the core glass bodies 11R become the core glass bodies 11P shown in FIG. 2 with little deformation and the clad glass bodies 12R and 12T become the clad glass body 12P shown in FIG. 2.

Here, if germanium is distributed on the surfaces of the glass bodies, the germanium volatilizes due to its characteristic. However, since the material of the outer regions 16R of the predetermined thickness in the core glass bodies 11R is chosen to be similar to the material of the outer region 16 as described above and thus undoped with germanium. Therefore, generation of gas due to germanium volatilizing from the core glass bodies 11R is prevented in this process where the core glass bodies 11R are heated. In addition, since the refractive index of the inner region 15P is made to be α power distribution in this embodiment, germanium is doped on the periphery side of the inner region 15P at a low concentration. Therefore, even when the predetermined thickness of the outer region 16 is small, generation of gas due to germanium volatilization is prevented.

Thus, the preform 10P shown in FIG. 2 is provided.

<Drawing Process P3>

Figure 5:
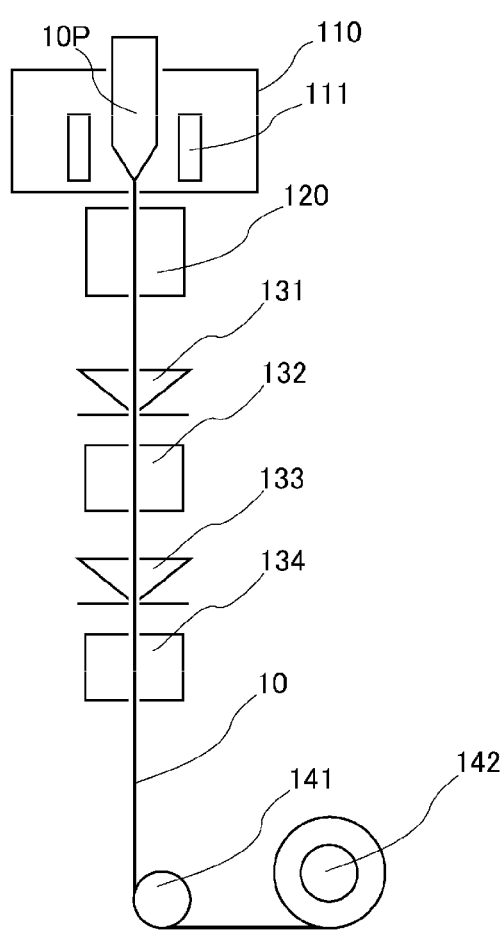
FIG. 5 is a view showing an aspect of a drawing process.

FIG. 5 is a view showing an aspect of the drawing process P3.

As a preparation step for the drawing process P3, the preform 10P produced through the arranging process P1 and the collapse process P2 is set in a spinning furnace 110. Then the preform 10P is heated by making a heating section 111 of the spinning furnace 110 to generate heat. At this time, the bottom of the preform 10P is heated to 2000° C., for example, so as to be melted. Then, glass is melted from the preform 10P and the glass is drawn. The thus drawn glass which is melted is solidified right after the glass is drawn out of the spinning furnace 110 so that the core glass bodies 11P become the cores 11 and the clad glass body 12P becomes the clad 12, whereby a multi-core fiber including the plurality of cores 11 and the clad 12 is formed. Thereafter, the multi-core fiber passes through a cooling device 120 so as to be cooled to an appropriate temperature. The temperature of the multi-core fiber when it goes into the cooling device 120 is about 1800° C., for example, but the temperature of the multi-core fiber when it comes out from the cooling device 120 is 40° C. to 50° C., for example.

The multi-core fiber that has come out of the cooling device 120 passes through a coating device 131 having ultraviolet light curable resin to be the inner protective layer 13 therein so that the multi-core fiber is coated with this ultraviolet light curable resin. Then, the multi-core fiber passes through an ultraviolet light irradiating device 132 to be irradiated with an ultraviolet light, whereby the ultraviolet light curable resin is cured to form the inner protective layer 13. Next, the multi-core fiber passes through a coating device 133 having ultraviolet light curable resin to be the outer protective layer 14 therein so that the multi-core fiber is coated with the ultraviolet light curable resin. Then the multi-core fiber passes through an ultraviolet light irradiating device 134 to be irradiated with an ultraviolet light, whereby the ultraviolet light curable resin is cured to form the outer protective layer 14, and thus the multi-core fiber 10 shown in FIGS. 1A and 1B is provided.

Then, a moving direction of the multi-core fiber 10 is changed by a turn pulley 141 and reeled by a reel 142.

Thus, the multi-core fiber 10 shown in FIGS. 1A and 1B is produced.

As described above, with the method of producing the preform 10P included in the first producing method of this embodiment, the outer regions 16R of the core glass bodies 11R are undoped with germanium, and thus generation of gas due to germanium volatilizing from the core glass bodies 11R can be prevented even when the core glass bodies 11R are heated in the collapse process P2. Therefore, generation of bubbles due to volatilized gas of germanium can be prevented between the core glass bodies 11P and the clad glass body 12P of the produced preform 10P.

Then, with the method of producing the multi-core fiber 10 using this preform 10P, the preform 10P in which generation of bubbles is prevented between the core glass bodies 11P and the clad glass body 12P is drawn. Therefore, the reliable multi-core fiber 10 in which generation of bubbles is prevented between the cores 11 and the clad 12 can be produced.

(Second Producing Method)

Next, a second method of producing the multi-core fiber 10 will be described. The second producing method is different from the first producing method in a point that the multi-core fiber 10 is produced without producing the preform 10P.

In the second producing method, an arranging process is performed similarly to the first producing method. That is, core glass bodies 11R and clad glass bodies 12R and 12T similar to those of the first producing method are prepared and the core glass bodies 11R and the clad glass bodies 12R and 12T are arranged similarly to the first producing method. Thus, a state where the core glass bodies 11R and the clad glass bodies 12R and 12T are arranged as shown in FIG. 4 is provided.

Then in the second producing method, the arranged core glass bodies 11R and clad glass bodies 12R and 12T are set in a spinning furnace while keeping their positions with respect to each other. In other word, the core glass bodies 11R and the clad glass bodies 12R and 12T arranged as shown in FIG. 4 are set in the spinning furnace 110 instead of the preform 10P shown in FIG. 5.

Then the core glass bodies 11R and the clad glass bodies 12R and 12T are heated by making the heating section 111 of the spinning furnace 110 to generate heat. With this heat, the core glass bodies 11R and the clad glass bodies 12R and 12T are drawn while collapsing spaces in the through hole of the clad glass body 12T such as gaps between the core glass bodies 11R and the clad glass bodies 12R. At this time, similarly to the first producing method, the outer regions 16R of the predetermined thickness in the core glass bodies 11R are undoped with germanium, and thus generation of gas due to germanium volatilizing from the core glass bodies 11R is prevented when the core glass bodies 11R are heated and melted.

The thus drawn glass which is melted becomes the multi-core fiber 10 similarly to the first producing method and then reeled by the reel 142. Thus, the multi-core fiber 10 shown in FIGS. 1A and 1B is produced.

As described above, with the second method of producing the multi-core fiber 10 of this embodiment, generation of gas due to germanium volatilizing from the core glass bodies 11R can be prevented even when the core glass bodies 11R are heated while drawn. Therefore, generation of bubbles due to volatilized gas of germanium can be prevented between the cores 11 and the clad 12, and thus the reliable multi-core fiber 10 can be produced.

(Second Embodiment)

Next, a second embodiment of the present invention will be described in detail referring to FIGS. 6A and 6B. Here, components that are identical or similar to those in the first embodiment are indicated by the same reference numerals and the same explanation will not be repeated unless otherwise particularly described.

Figure 6A:
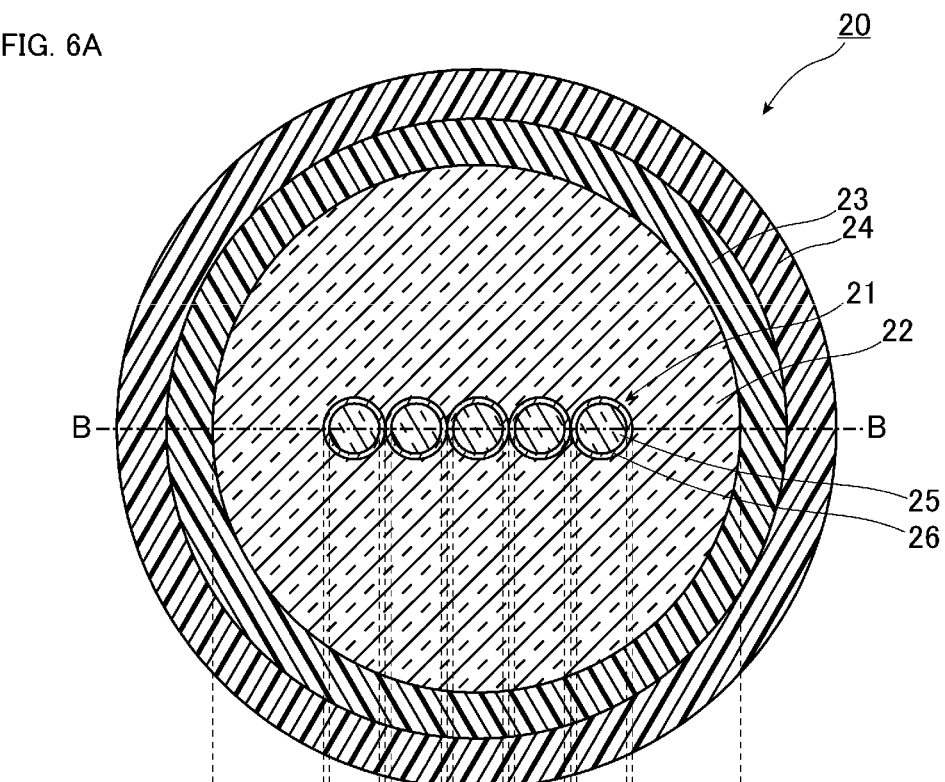
FIGS. 6A and 6B are views showing an aspect of a coupled multi-core fiber according to a second embodiment of the invention.
Figure 6B:
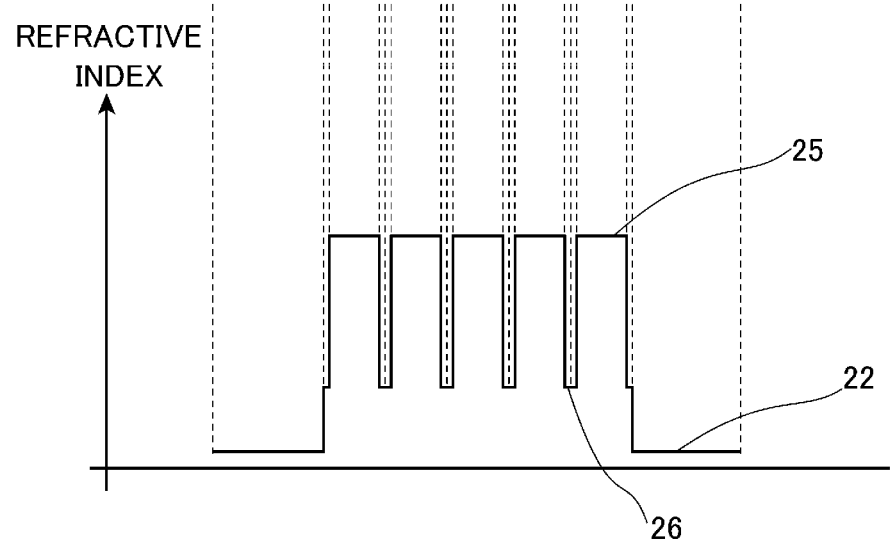

FIGS. 6A and 6B are views showing an aspect of a coupled multi-core fiber (referred to as a multi-core fiber, hereinafter) according to the second embodiment of the invention. Specifically, FIG. 6A a sectional view perpendicular to the longitudinal direction of the multi-core fiber according to this embodiment, and FIG. 6B is a view showing the refractive index distribution along the line B-B.

As shown in FIG. 6A, a multi-core fiber 20 of this embodiment includes: a plurality of cores 21; a clad 22 of the shape and the material similar to those of the clad 12 of the multi-core fiber according to the first embodiment; an inner protective layer 23 and an outer protective layer 24 of the shape and the material similar to those of the inner protective layer 13 and the outer protective layer 14 of the first embodiment respectively.

Similarly to the plurality of cores 11 of the first embodiment, the plurality of cores 21 are made to have substantially the same diameter as each other, and arranged linearly along the radial direction of the clad 22 while the periphery surfaces of adjacent cores 21 contact with each other. In addition, each of the cores 21 includes: an outer region 26 of the shape and the material similar to those of the outer regions 16 of the cores 11 according to the first embodiment; and an inner region 25 of the shape and the material similar to those of the inner regions 15 of the cores 11 according to the first embodiment. The refractive index distribution of the inner region 25 is constant and higher than that of the outer region 26. In other word, the multi-core fiber 20 of this embodiment is configured similarly to the multi-core fiber 10 of the first embodiment except for that the refractive index of the inner region 25 is constant. The inner region 25 described above is made of silica glass doped with germanium, which increases the refractive index, at a constant concentration.

Also with the multi-core fiber 20 described above, when a light propagates through the core, a low-intensity light can spread farther from the center of the core comparing to a core without the outer region 26 similarly to the multi-core fiber of the first embodiment. Therefore, the cores 21 adjacent to each other can be strongly coupled. Therefore, the plurality of cores 21 can be regarded as a multimode transmission path as a whole, and thus mode multiplexing transmission, in which signals are superimposed to respective modes of lights propagating through the cores 21, is possible. In addition, since the respective cores 21 have the outer regions 26, the center-to-center distances between the cores adjacent to each other can be larger comparing to the case where the periphery surfaces of the cores without the outer regions 26 contact with each other similarly to the multi-core fiber 10 of the first embodiment. Therefore, when mode multiplexing transmission is performed as described above, it is easier to extract individual lights propagating through the respective cores and thus easier to perform mode separation comparing to the case where the periphery surfaces of the cores without the outer regions 26 contact with each other.

The multi-core fiber 20 described above can be produced by using core glass bodies including: outer regions similar to the outer regions of the core glass bodies 11R; and inner regions having the same shape as the inner regions 15 and having the refractive index, which is higher than the refractive index of the outer regions and constant, instead of the core glass bodies 11R in the method of producing the multi-core fiber 10 according to the first embodiment.

Although the invention has been described above by reference to the first and second embodiments as examples, the invention is not limited thereto.

For example, the material of the outer regions 16 and 26 of each of the cores 11 and the cores 21 according to the embodiments can be silica glass doped with any other dopant as long as the outer region 16 has the refractive index between the clad 12 and the inner region 15 or the outer region 26 has the refractive index between the clad 22 and the inner region 25. For example, germanium, aluminum, or phosphorus may be doped as dopant. In this case, an amount of germanium in the inner region 15 of the first embodiment and an amount of germanium in the inner region 25 of the second embodiment may be adjusted so as to present the refractive index distributions shown in FIG. 1B and 6B respectively. In addition, when the outer regions 16 and 26 of the cores 11 and 21 are doped with germanium, aluminum, or phosphorus, the clads 12 and 22 can be made of pure silica glass or silica glass slightly doped with chlorine as long as the refractive indexes of the clads 12 and 22 are lower than the refractive indexes of the outer regions 16 and 26 respectively. When the outer regions 16 and 26 are doped with germanium, it is preferable that bubbles not be generated between the cores 11 and 21 and the clads 12 and 22 respectively because of gas due to germanium volatilization during the process of producing the multi-core fibers 10 and 20.

In the first and second embodiments, a plurality of cores 11 and 21 are arranged in one horizontal line. However, the present invention is not limited thereto and cores can be differently arranged. For example, in the cross-section of a multi-core fiber, a plurality of cores can be arranged in a matrix of three rows and three columns while the periphery surfaces of adjacent multi-core fibers contact with each other. Alternatively, one core can be arranged at the center of the clad and six cores can be arranged to surround the one core while contacting with the one core. Further, the multi-core fibers each having five cores are described in the first and second embodiments as examples, however, each of the multi-core fibers may have two to four or five cores.

Each of the clads 12 and 22 may have a two-layered structure. In this case, it is preferable that an inner region of the clad be made of silica glass doped with fluorine and an outer region of the clad be made of pure silica glass or silica glass slightly doped with chlorine, for example. The reason is that a multi-core fiber as a whole can have a high strength by using pure silica glass or silica glass slightly doped with chlorine, which has a high strength, for an outer region of a clad since the breaking strength of the multi-core fiber depends on the strength of the outer surface of the clad. In this case, the tubular clad glass bodies 12T and 22T in the first and second embodiments may be made of pure silica glass or silica glass slightly doped with chlorine.

In the embodiments described above, the respective cores 11 are made to have the same diameters and refractive indexes as each other and the respective cores 21 have the same diameters and refractive indexes as each other, however, in the present invention, the respective cores 11 or 21 may have diameters and refractive indexes different to each other. However, it is preferable that the respective cores 11 have the same diameters and refractive indexes as each other and the respective cores 21 have the same diameters and refractive indexes as each other from the viewpoint of coupling the respective cores 11 or 21 strongly. Even when the respective cores 11 or 21 have diameters and refractive indexes different to each other, it is preferable that the respective cores be made to have the same optical wave guiding properties as each other from the viewpoint of coupling the respective cores 11 or 21 strongly.

INDUSTRIAL APPLICABILITY

As described above, according to the present invention, a coupled multicore fiber capable of easily extracting lights propagating through the respective cores while the adjacent cores are coupled strongly. By utilizing the present invention, optical communications utilizing mode multiplexing transmission can be easily performed.

The invention claimed is:

1. A coupled multi-core fiber comprising a plurality of cores and a clad surrounding the plurality of cores, wherein the plurality of cores are arranged in such a way that periphery surfaces of adjacent cores among the cores contact with each other, and each of the cores is made to have a refractive index higher than the clad and includes: an outer region having a predetermined thickness from a corresponding one of the periphery surfaces; and an inner region made to have a higher refractive index than the outer region and surrounded by the outer region, wherein a refractive index distribution of the inner region is $\alpha$ power distribution, and the $\alpha$ power distribution is expressed by an equation of $n(r)=n_1[[1-2\Delta(r/\alpha)^\alpha]^{1/2}$, where "r" represents a distance from the center of the inner region, "$n_1$" represents the refractive index of the inner region at the center thereof, "$\Delta$" represents a relative refractive index difference of the inner region from the outer region, "a" is a diameter of the inner region, and "$\alpha$" is set to 1.5 to 5.

2. The coupled multicore fiber according to claims 1, wherein a relative refractive index difference of the inner region from the clad at a position where the refractive index is the highest in the inner region is set to 0.85% to 3.5%.

3. The coupled multicore fiber according to claim 2, wherein a relative refractive index difference of the outer region from the clad is set to 0.3% to 0.8%.

4. The coupled multicore fiber according to any one of claims 1, 2, and 3, wherein a ratio of a diameter of the inner region and a diameter of each of the cores is set to 0.5 to 0.9.

* * * * *